(12) United States Patent  
Ling et al.

(10) Patent No.: US 8,332,504 B2  
(45) Date of Patent: Dec. 11, 2012

(54) METHOD FOR TESTING CONNECTIVITY OF SOFTWARE APPLICATIONS HOSTED ON NETWORKED COMPUTERS

(75) Inventors: Calvin Ling, Bellevue, WA (US); George K. Wu, Bellevue, WA (US); Michael J. McNicholl, Renton, WA (US); Seth J. Thorup, Sandy, UT (US)

(73) Assignee: The Boeing Company, Chicago, IL (US)

( * ) Notice: Subject to any disclaimer, the term of this patent is extended or adjusted under 35 U.S.C. 154(b) by 1625 days.

(21) Appl. No.: 11/645,391

(22) Filed: Dec. 26, 2006

(65) Prior Publication Data

US 2008/0155513 A1   Jun. 26, 2008

(51) Int. Cl.
*G06F 15/173* (2006.01)
*G06F 9/44* (2006.01)
*G06F 9/45* (2006.01)

(52) U.S. Cl. ........... 709/224; 709/218; 717/135; 703/22

(58) Field of Classification Search .......... 709/217–229; 717/135; 703/6–16

See application file for complete search history.

(56) References Cited

U.S. PATENT DOCUMENTS

| | | | | |
|---|---|---|---|---|
| 7,406,050 B2 * | 7/2008 | Calluaud et al. | ............ | 370/250 |
| 7,636,653 B1 * | 12/2009 | Chan et al. | ............ | 703/14 |
| 7,693,986 B2 * | 4/2010 | Berbiguier et al. | ........... | 709/224 |
| 2004/0194022 A1 * | 9/2004 | Cleraux et al. | ............ | 715/513 |
| 2005/0220029 A1 | 10/2005 | Calluaud et al. | | |
| 2006/0156268 A1 * | 7/2006 | Wen et al. | ............ | 716/18 |
| 2006/0224375 A1 * | 10/2006 | Barnett et al. | ............ | 703/22 |

* cited by examiner

*Primary Examiner* — Yasin Barqadle

(74) *Attorney, Agent, or Firm* — Ostrager Chong Flaherty & Broitman P.C.

(57) ABSTRACT

A method for verifying the connectivity of software applications hosted on networked computers. The connectivity of hosted function applications to be loaded into networked computers is verified and validated using quasi-hosted function applications that simulate the communications functions (i.e., connectivity) of those hosted function applications. The quasi-hosted function applications are run on the same hardware that the real hosted function applications will be run on. Furthermore, the connectivity of a real hosted function application loaded into one computer can be verified and validated by simulating communications of that real hosted function application with a multiplicity of quasi-hosted function applications running on the networked computers.

17 Claims, 2 Drawing Sheets

METHOD FOR TESTING CONNECTIVITY OF SOFTWARE APPLICATIONS HOSTED ON NETWORKED COMPUTERS

TECHNICAL FIELD

The present disclosure relates generally to methods for verifying the connectivity of software applications hosted on networked computers. In particular, this disclosure relates to methods for verifying and validating the interface configurations of software applications hosted on networked computers of an avionics system.

BACKGROUND

Avionics systems typically have a variety of components that provide data to other components of the aircraft or exchange data among one or more other components of the aircraft. An avionics system typically includes multiple general purpose modules(GPMs), which are computers for general computing needs. Other computers are special purpose computers, such as line replaceable units (LRUs) and remote data concentrators (RDCs). For example, a variety of external sensors may gather information (e.g., speed, direction, external temperature, and the like) that is routed via an avionics network or databus to one or more aircraft components. The data from multiple sensors may be collected by a strategically located RDC and then sent to other avionics system components via the avionics network or databus. An RDC or LRU may also be used to send control signals to actuators and valves.

Components of an avionics system can be connected via an Ethernet type network through network switches. In an avionics network environment, the Ethernet network has various components (e.g., LRUs, RDCs) that form a publisher and subscriber relationship. Each network publisher can send packets in digital form, at controlled rates, to one or more subscribers. When a switch receives the packets, the switch determines the destination equipment and routes the packets to such equipment.

ARINC 664 Part 7 sets forth an aeronautical standard that defines a dual redundant avionics network for use in an aircraft environment and more specifically describes an Avionics Full DupleX (AFDX) switched Ethernet network. In a switched full-duplex Ethernet type network, the term "full-duplex" refers to sending and receiving packets at the same time on the same link, and the term "switched" refers to the packets being switched in switches on appropriate outputs. The AFDX network uses multiple switches and redundant paths to route data, point-to-point or point-to-multipoint across the switches. AFDX switches use store-and-forward technology. The AFDX network also includes end systems, which behave like conventional network interface cards that connect system components like LRUs, RDCs, and GPMs to the network media Aircraft subsystems can communicate with each other over an AFDX network using virtual links. Each virtual link defines a particular routing of information in the AFDX network. In particular, a virtual link defines the data source and its destinations. Each virtual link can have a defined bandwidth set by its transmission frequency and its packet's maximum payload size. An AFDX end system may implement a number of virtual links for transmission of data and also defines other virtual links as a receiver. Multiple aircraft subsystems can be grouped physically and connected to the AFDX network by end systems.

The Boeing 787 program has vendors who supply hardware and tools (platform suppliers) and suppliers who provide software applications (hosted function suppliers) for its avionics system comprising a multiplicity of subsystems (i.e., computers) connected by a network. Avionics interfaces of the types previously described can also be used to instrument all of the parameters of the various subsystems and electronically collect this data for presentation to the flight crew for use in flying the aircraft. To facilitate data transmission across the network, the various subsystems must be properly configured. These subsystems have all their configuration parameters and data stored inside an Interface Configuration Database (ICD) in XML file format. These XML files define how each component of the avionics system is connected and configured, how the data (and what kind of data) flow from one end of the system to another, how various devices in the system interact with each other, and the transmission and receiving rates for each message going through the network, etc.

More specifically, the ICD contains all the data and parameters (several hundred thousand) for configuration of airplane avionics systems. These data and parameters define how components on the airplane communicate with each other (protocol), dictate rate/frequency at which they initiate and respond to communication protocols, and allocate in which computing node a particular application program resides, to name just a few. Since each node hosts multiple applications, the ICD also stipulates where in a computer node's memory space each application should stay. All these data and parameters are entered into the ICD manually by engineers.

The system platform suppliers and hosted function suppliers depend upon the aforementioned ICD parameters and data for configuration so that all hardware and software components can work and function together smoothly when all of them bring their modules to the airplane for Boeing to conduct final system integration and assembly. However, there has been no easy and reliable way to verify and validate that those hundreds of thousands of parameters and data in the ICD were entered correctly or that their complicated dependency structures were defined accurately. Traditionally this verification and validation process has been carried out manually, which is extremely labor intensive and error prone. Many engineers, with pencil and paper, can spend days to ensure that what they have entered into the ICD is correct and accurate. When any changes or modifications occur in the ICD, which happens frequently during the initial engineering stage of the airplane development, they can cause a ripple effect across the system. Very often the engineers are forced to make profound changes in both the component and system level configuration files and the laborious manual checking process must be repeated to mitigate any undesirable ramifications.

Furthermore, when one hosted function supplier comes in for system testing and integration, its software application must be running in a functioning avionics system where the hosted function can check its application behavior, performance and characteristics. Currently the avionics system for the Boeing 787 airplane may have 60 plus hosted function applications. When the first couple of hosted function vendors show up for system testing and integration, there will be no running avionics system because to drive data flow as per ICD configuration requires hosted function applications. This presents a classic "chicken or the egg" dilemma—to verify and validate the ICD configuration requires integrated and validated hosted function applications, but to integrate and validate the hosted function applications demands a validated ICD configuration.

There is a need for an automated method for verifying and validating configuration parameters and data of hosted function applications to be loaded into networked computers at the system level. There is a further need for a system that simulates the communications functions of hosted function applications to be run on a not yet fully functional networked computer system, for the purpose of enabling a hosted function supplier to plug in its application software for system level testing and integration.

SUMMARY

The present disclosure is directed to systems and methods for verifying the connectivity of software applications hosted on networked computers. In accordance with one embodiment, the connectivity of hosted function applications to be loaded into networked computers is verified and validated using quasi-hosted function applications that simulate the communications functions (i.e., connectivity) of those hosted function applications. These quasi-hosted function applications are run on the same hardware on which the real hosted function applications will be running. In accordance with another embodiment, the connectivity of a real hosted function application loaded into one computer networked to other computers is verified and validated by simulating communications of that real hosted function application with a multiplicity of quasi-hosted function applications running on other computers and, if applicable, on the same computer (if the network design calls for more than one hosted function application to be run on that computer) of the network. In accordance with one implementation, the quasi-hosted function applications are generated automatically by a process called "Static Simulation Automated Code Generation" that uses XML-based configuration files for hosted function applications as inputs.

One aspect is a method for testing the connectivity of software applications hosted on networked computers, comprising the following steps: using configuration files for respective desired hosted function applications to generate quasi-hosted function applications that simulate the communications functions of respective ones of the desired hosted function applications, each configuration file containing configuration parameters and data; building executable files for the quasi-hosted function applications and loading the executable files into networked computers; causing one or more of the quasi-hosted function applications to exchange data blocks among quasi-hosted function applications via the network; and acquiring and analyzing data representing the connectivity of the quasi-hosted function applications.

Another aspect is a method for testing the connectivity of a software application hosted on a networked computer, comprising the following steps: using configuration files for respective hosted function applications to generate quasi-hosted function applications that simulate the communications functions of respective ones of the hosted function applications, each configuration file containing configuration parameters and data; building executable files for the quasi-hosted function applications and loading the executable files into networked computers; loading a hosted function application into one of the networked computers; causing the hosted function application to send data blocks to one or more quasi-hosted function applications via the network and/or receive data blocks from one or more quasi-hosted function applications; and acquiring and analyzing data representing the connectivity of the hosted function application.

A further aspect is a system comprising a multiplicity of computers connected by a network, each computer hosting one or more executable quasi-hosted function applications that simulate the communications functions of respective desired hosted function applications, wherein each of the quasi-hosted function applications simulates a sender and/or a receiver of a respective desired hosted function application, and comprises an instrumentation algorithm that is used to log any one of the following: mismatch of data block size, mismatch of rates/frequencies or total miss of message data blocks, and network, switches, and end systems jitters in various real avionics operating modes.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION

The present disclosure describes a method for verifying the connectivity of software applications hosted on networked computers. The connectivity of hosted function applications to be loaded into networked computers is verified and validated using quasi-hosted function applications that simulate the communications functions (i.e., connectivity) of those hosted function applications. The quasi-hosted function applications are run on the same hardware that the real hosted function applications will be running on. Furthermore, the connectivity of a real hosted function application loaded into one computer can be verified and validated by simulating communications of that real hosted function application with a multiplicity of quasi-hosted function applications running on the networked computers. Many specific details of certain embodiments are set forth in the following description to provide a thorough understanding of those embodiments. One skilled in the art, however, will understand that the invention encompasses additional embodiments and may be practiced without several of the details described below.

The embodiments disclosed herein comprise a network of computers that are components of an avionics system. However, the subject matter claimed hereinafter has application in other systems of networked computers and is not limited to employment aboard an airplane.

Figure 1:
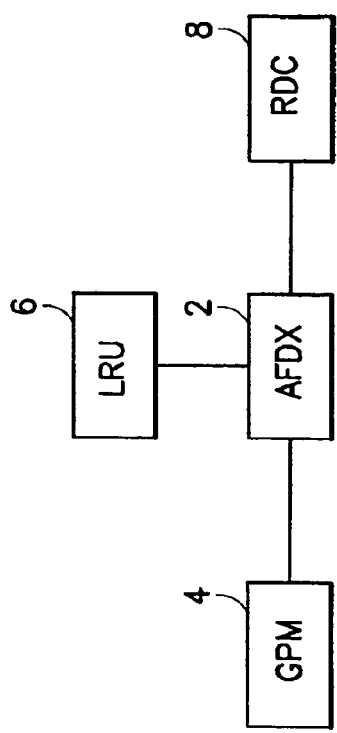
FIG. 1 is a block diagram showing components of a known avionics system.

FIG. 1 illustrates some of the types of components making up a typical modern avionics system. This typical avionics system comprises a multiplicity of computers connected by an AFDX network. This AFDX network in turn comprises switches, end systems and virtual links as previously described in the Background section. In one embodiment, each AFDX end system is a specially made fault-tolerant and deterministic network interface card, and each AFDX switch is a specially made fault-tolerant and deterministic network switch/router. The details of such an AFDX network are well known in the art and will not be described in further detail herein. The typical avionics system comprises a multiplicity of general purpose modules (GPMs), which are computers for general computing needs. Only one GPM (number 4) is depicted in FIG. 1. Other computers of the avionics system, such as line replaceable units (LRUs) and remote data concentrators (RDCs), are special purpose computers. Only one LRU (number 6) and one RDC (number 8) are depicted in FIG. 1. Selected ones of the GPMs, LRUs and RDCs can be configured to communicate with each other via the AFDX network 2. Some of these computers can also be configured to communicate with other computers via other types of networks or databases. In other words, the avionics system may incorporate more than one type of network or databus for enabling its system components to communicate.

The methods disclosed herein for verifying the connectivity of software applications hosted on networked computers may be employed in the construction of an aircraft having an avionics system comprising a multiplicity of computers connected by a network or databus. To facilitate data transmission across the network, the various subsystems must be properly configured.

In accordance with one implementation, the avionics subsystems can have all their configuration parameters and data stored inside an Interface Configuration Database (ICD) in XML file format. These XML configuration files define how each component of the avionics system is connected and configured, how the data (and what kind of data) flow from one end of the system to another, how various devices in the system interact with each other, etc. More specifically, the ICD contains all the data and parameters (several hundred thousand) for configuration of airplane avionics systems. These data and parameters define how components on the airplane communicate with each other (protocol), dictate rate/frequency at which they initiate and respond to communication protocols, and allocate in which computing node a particular application program resides. Since each node hosts multiple applications, the ICD also stipulates where in a computer node's memory space each application should stay.

Figure 2:
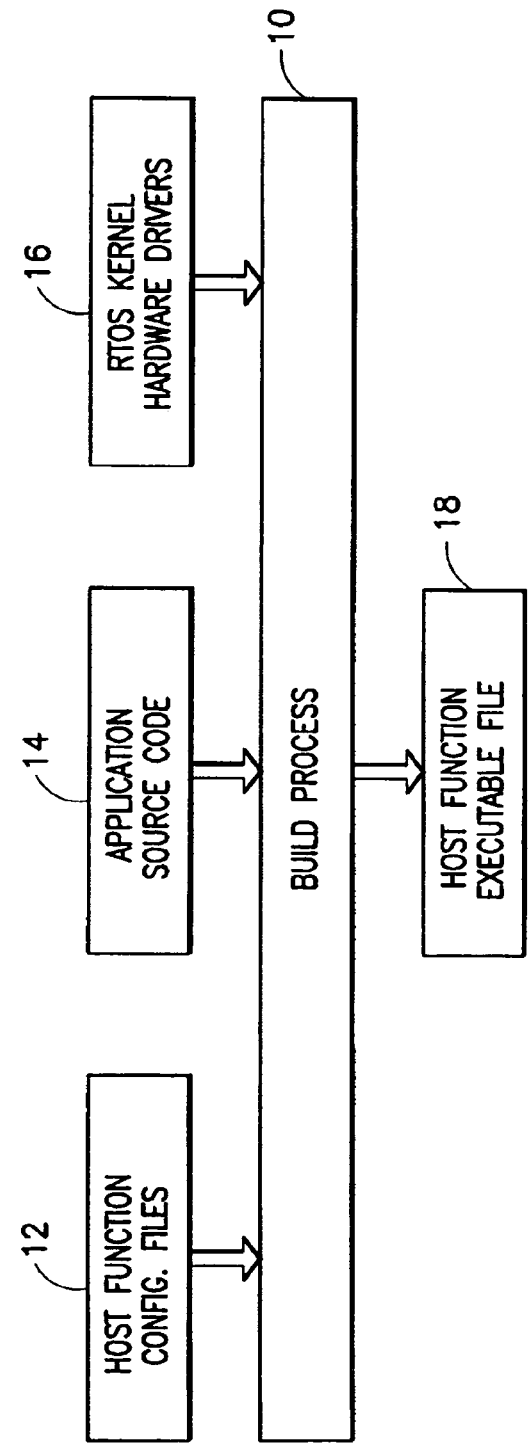
FIG. 2 is a flowchart depicting a process for building executable files for an avionics system having distributed components.

The Boeing 787 program has multiple vendors who supply platforms (hardware and tools) and software (i.e., hosted function) applications for assembly of its avionics system. These suppliers depend upon the ICD parameters and data for configuration so that all the hardware and software components can work and function together smoothly when the system is assembled. To supply these vendors with the needed configurations, the data from the ICD is exported out in a single 2-gigabyte XML file. A special tool is used to process this single gigantic XML file and break it into many smaller and manageable sets of XML files for each system component. More specifically, the large system configuration database file containing configuration parameters and data for multiple desired hosted function applications is parsed into a multiplicity of component configuration files respectively containing the configuration parameters and data for respective ones of the multiplicity of desired hosted function applications. These component XML configuration files are then distributed to the various component vendors and suppliers for their unit or sub-system configuration and testing. Each hosted function supplier must then build an executable file that is the hosted function application for the particular module at issue. The build process 10 is depicted in FIG. 2. The hosted function configuration files 12, application source code 14 and a real-time operating system (RTOS) kernel (including hardware drivers) 16 are compiled and linked to generate hosted function executable files 18 (in binary format). The compiler translates the source code into object/ machine code. The linking procedure combines the object/ machine code from the hosted function application and RTOS kernel into one executable code module. Later the vendor or supplier will bring this executable hosted function application to a Boeing facility for final system integration and testing.

To facilitate system integration, it is desirable that each hosted function supplier should be able to plug in his module for system testing and integration. However, this is not possible at an early stage when most hosted function applications have not yet been provided, i.e., when a functioning avionics system is not yet running. There will be no running avionics system because to drive data flow in accordance with the configurations stored in the ICD requires hosted function applications.

This problem can be solved by generating an avionics system infrastructure comprising executable quasi-hosted function applications that simulate the communications functions of the hosted function applications specified by system requirements. These executable quasi-hosted function applications are then loaded into the hardware (i.e., computers) of the avionics system. A supplier can then plug in his hosted function application for system integration and testing. When this real hosted function application is brought in for testing, the quasi-hosted function application corresponding to it can be backed out of the avionics system and the real hosted function application is loaded in its place. Once installed in the avionics system, the connectivity of the real hosted function application is exercised by means of attempts to send and/or receive data packets to and/or from one or more quasi-hosted function applications via the network. Which quasi-hosted function applications the real hosted function application communicates with during system operation is dictated by the interface configuration for that real hosted function. During this testing process, data representing the connectivity of the real hosted function application is acquired and analyzed.

Alternatively, the above-described avionics system infrastructure comprising quasi-hosted function applications loaded into networked computers can be exercised to verify and validate the ICD parameters and data for system-wide correctness and accuracy. In this instance, the connectivity of each quasi-hosted function application can be exercised by means of attempts to send and/or receive data packets to and/or from other quasi-hosted function applications via the network. Which quasi-hosted function applications communicate with each other is again dictated by the interface configurations for the corresponding real hosted function applications. During this testing process, data representing the connectivity of each quasi-hosted function application is acquired and analyzed.

As a result, all the ICD parameters and data can run through the avionics system from end to end. The data flow results can be verified and system performance can be evaluated. Moreover, the results of these system analyses can be fed back into the ICD to generate a new set of configuration parameters and data. These new component configuration files can then be used to generate new quasi-hosted function applications that represent the communications functions of an avionics system having improved connectivity. These new quasi-hosted function applications can then be loaded into the avionics system hardware and exercised. This iterative process can be repeated until the ICD parameters and data for the various system components have been fine tuned to optimize connectivity amongst the avionics system components.

In accordance with one embodiment, a so-called Static Simulation Auto Code Generation process uses ICD XML-based configuration files as inputs to generate a software suite automatically. The Static Simulation Auto Code Generation tool chain uses ICD data and parameters (in XML files) as input and automatically produces avionics system applications in C language as a running and functioning avionics system infrastructure. The resultant running and functioning avionics system infrastructure, with real production parameters and data from the ICD, can verify and validate ICD parameters and data for system-wide correctness and accuracy and enable hosted function application software suppliers to plug in their software for system testing and integration. Furthermore, by evaluating system performance and resource allocation, one can further fine tune the system with various test data and feed them back into the ICD to generate a new set of configuration files. This automatic process promises a quick turn-around time, which is especially useful during the flight test stage. Finally with the automatic code generation and the ICD, one can test and evaluate final airplane configurations way before vendors and suppliers show up with their hardware and software components for airplane level system integration.

Component level XML hosted function interface configuration files capture message data senders and receivers, sizes of the message data that pass between the sender and receiver, and the rates/frequencies at which the data messages are transmitted and received by senders and receivers, respectively. In addition the protocols that transmit and receive message data for all the senders and receivers are fully stipulated. The Static Simulation Auto Code Generation tool chain extracts the aforementioned data and parameters from the component XML configuration files (using XML stylesheets) and automatically generates C language source code, makefiles, and build directories to build those C language programs. Together with other tools (in this case Java Script), the entire avionics system infrastructure can be generated automatically. The generated C language source files, makefiles and build directories are input to a build process along with the XML hosted function configuration files and the RTOS kernel (including hardware drivers) for each system module. (The RTOS configuration is included in the component configuration files.)

As previously described, the build process involves compiling and linking. The compiler translates the source code into object/machine code. The linking procedure combines the object/machine code from the C language source code and RTOS kernel into one executable code module. In one embodiment, the makefile is a text file that defines how to compile each source code file and how to link them together. The build process executes the instructions in the makefile and generates object/machine code files at the location specified by the build directory.

A result of the build process for each module is a quasi-hosted function application (in the form of an executable file) that simulates a sender and/or a receiver. A "quasi-hosted function application" is a fake hosted function: both have the same inputs and outputs format, but the quasi-hosted function application lacks the algorithms to process these inputs and outputs. In the case of a sender, the quasi-hosted function application simulates a sender to send out message data blocks, with the exact sizes and at the right rates/frequencies as defined in the ICD, via proper protocols to the receivers, which are also designated in the ICD. By the same token, the receiver programs receive the message data blocks at the exact rates/frequencies via proper protocols from the senders.

Moreover, the sender and receiver programs have built in instrumentation algorithms. As used herein, "instrumentation" means keeping track of and checking whether the hosted function applications can execute and perform to the expectations of the system configuration. For example, the system configuration may state that hosted function application A sends out 20 bytes to hosted function application B every 10 milliseconds, 30 bytes to hosted function application C every 20 milliseconds, and 40 bytes to hosted function application D every 30 milliseconds, and receives 40 bytes from hosted function application X every 40 milliseconds. In that case, during testing using the avionics system infrastructure, the instrumentation functionalities in the quasi-hosted function applications corresponding to hosted function applications A-D and X will report when and from whom they received and how many bytes of data were received. Any mismatch of data block size, rates/frequencies, or total miss of message data blocks from the senders are automatically logged to a disk file for post-test analysis.

It should be apparent that when the receiver never misses any data blocks from the sender and the data blocks from the sender arrive at the correct rates/frequencies and the data block sizes per se are in accordance with the configuration specifications in the ICD, then the communication channel between the sender and receiver is well connected. Under the same scenario, when computer node A transmits message data blocks to computer node B, which in turn sends data to computer node C, which turns around and delivers data blocks to computer node D and when node D receives data with valid protocols and at the rates as defined in the ICD, one can fairly presume that all the three connection channels A→B, B→C, and C→D are well connected. This validates that the XML configuration files for these computer nodes are in good working order and the connections amongst them are correctly configured. This also verifies that all the input data and output data are correct in terms of data size and timing.

The Static Simulation Auto Code Generation process will now be described in more detail with reference to FIG. 3.

Inputs for Static Simulation Auto Code Generation

Module and hosted function XML configuration files (block 22 in FIG. 3) are taken directly from the ICD. There is one module XML configuration file for each module (i.e. GPM, LRU, or RDC), and a typical system may consist of multiple (e.g., 76) modules. Each module usually contains many hosted functions. Each hosted function in turn has its own XML configuration file. The module configuration file defines each hosted function for memory size, execution rate and schedule, how it should reside inside the module, and how all hosted functions inside the module should be connected with other hosted functions. The hosted function XML configuration file has information concerning what communication protocol to use to communicate with another hosted function, whether this hosted function is a sender or receiver, memory resource allocation for this hosted function, transmission and receiving data block sizes, and data transmission rates, etc.

In addition, End System text configuration files (block 24 in FIG. 3) are taken directly from the ICD. Each module has one AFDX End System configuration file. This text-based configuration file describes how the AFDX end system for the current module is configured and how it should be built so that the text in the configuration file can be translated into binary file, which is to be loaded to the end system for execution.

Also, AFDX Switch text configuration files (block 26 in FIG. 3) are taken directly from the ICD. Each module must connect to an AFDX switch so that it can receive messages from other modules and send data blocks out to other modules. The system contains several switches. This text-based configuration file dictates how the particular switch is configured and how it should be built (a process that the text in the configuration file can be compiled into binary file to be loaded into the switch).

A kernel XML configuration file and a Core OS binary file (block 28 in FIG. 3) are taken directly from the ICD. The Core OS is the binary operating system for the module and it is pre-configured. The Static Simulation Auto Code Generation (block 20 in FIG. 3) does not use it directly—it simply passes it to the build process (block 10 in FIG. 3) so that the OS can be linked into the module executable binary file for execution. The kernel XML configuration file just lists where this Core OS file resides so it can be copied by the build process from the source folder to the target (i.e., the build directory). Each module has its own unique Core OS pre-configured for its operating environment.

Outputs for Static Simulation Auto Code Generation

Figure 3:
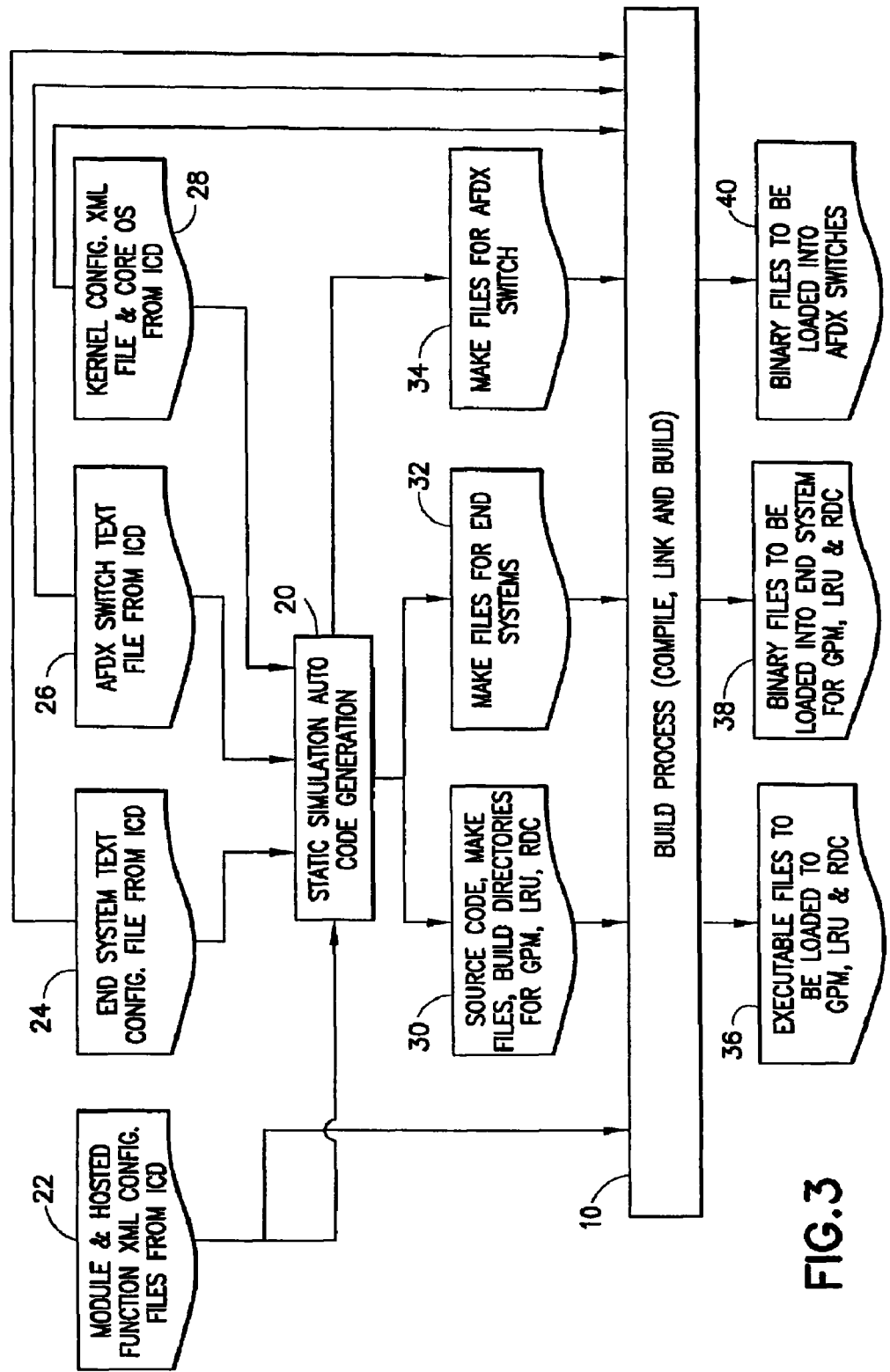
FIG. 3 is a flowchart depicting a process for building executable files for an avionics system having distributed components, which executable files represent quasi-hosted function applications that simulate the communications functions (i.e., connectivity) of real hosted function applications.

The Static Simulation Auto Code Generation process outputs source code files, makefiles, and build directories for each GPM, LRU, or RDC (block 30 in FIG. 3). The module is the top directory. Under it, each hosted function has its own independent directory that bears the name of the hosted function. When source code files for hosted functions are generated, they reside in each hosted function directory together with makefiles. The makefiles are software tools to build these hosted functions. When all the hosted functions under a particular module are compiled and linked, they together form a single executable binary file (including the AFDX End System binary file) for the module and this file will be loaded into the module for execution.

The Static Simulation Auto Code Generation process also outputs makefiles for the AFDX end systems (block 32 in FIG. 3). Since each module has an end system and it is pre-configured distinctly with a unique text configuration file, the makefile for the module is generated for the build process to match the tool and the text file so that the binary file can be produced from the text file by the build process.

The Static Simulation Auto Code Generation process also outputs makefiles for the AFDX switches (block 34 in FIG. 3). Each system has several AFDX switches and each is distinctly pre-configured with a unique text configuration file. The makefile for each AFDX switch is generated to be consumed by the build process so that the latter can locate the tool to render the text files info binary files to be loaded into the AFDX switch.

Build Process

The build process (block 10 in FIG. 3) compiles the source code for all the hosted functions into binary object code, and links them together with the Core OS binary code, End System binary code, and other libraries to create a single executable binary file for each module (block 36 in FIG. 3). This is the final binary file that will be loaded into each module eventually for execution.

Prior to the creation of the module binary file, the build process translates the End System text configuration file into a binary file (block 38 in FIG. 3), which will be linked into the module binary file for execution.

Additionally, the build process also transforms the text configuration for AFDX switch into a binary file (block 40 in FIG. 3) that will be separately loaded into the AFDX switch.

Furthermore, the build process also has other software tools to conduct validity check on module level, hosted function level, and End System configurations files. As the respective terms are used herein, the build process (block 10 in FIG. 3) is not part of the Static Simulated Auto Code Generation tool (block 20 in FIG. 3).

Outputs of the Build Process

Three types of binary files are produced by the build process: the binary executable file for a particular module, the binary files for AFDX end system, and the binary file for AFDX switch (see blocks 36, 38 and 40 respectively in FIG. 3). The last one is system based whilst the first two are module based.

Static Simulation Auto Code Generation Operation

The Static Simulation Auto Code Generation tool chain (block 20 in FIG. 3) consists of two major software parts—a script file program and a set of XML Extensible Stylesheet Language (XSLT) files. The main function for the script program is to create build directories for hosted functions source code, compose makefiles in those directories to build the hosted functions source code, and invoke the proper XSLT files to automatically generate the quasi-hosted functions. On the other hand, the XSLT files are the auto code generator. They process the module and hosted function XML configuration files to pick out the needed information and data so that the quasi-hosted functions can be generated. In short, the script program creates an environment to host the quasi-hosted function source code files whilst the XSLT files generate the quasi-hosted functions.

The module XML configuration file contains all the hosted function specifications. The script program reads this XML file to create one sub-directory for each hosted function under the module folder and fill in relevant makefiles in those directories. Thus, the binary executable files for all the quasi-hosted functions, at both the module level and hosted function level (plus binary file for the End System), can be built.

The script program also invokes the XSLT stylesheet to automatically generate quasi-hosted function source code. Each XSLT stylesheet generates a portion of the quasi-hosted functions. By calling each XSLT stylesheet in the right order, the script program drives how each quasi-hosted function is composed.

The XSLT stylesheets actually generate quasi-hosted function source code. They process each hosted function XML configuration file to obtain information on each message transmission protocol and rate, message flow direction (sending or receiving), message block size, and the message connection points (who sends to whom and who receives from whom). Based on the given information the XSLT stylesheets come to work—for every message to be sent, the XSLT generates source code to send the message data block with the dictated data block size, at the pre-defined rates, with the stipulated protocol, and to the designated receiver. The same principle applies to every message to be received by the quasi-hosted function, except that the direction of transmission changed from sending to receiving.

In summary, the XSLT stylesheets use the definitions of each message data block inside the hosted function XML configuration file to create source code to process each of these messages via a transmission or receiving algorithm.

To ensure the quasi-hosted functions satisfy the lab working environment, some instrumentation algorithm source code is injected into each quasi-hosted function by the XSLT stylesheets for system performance and characterization testing purpose. These instrumentation functionalities also demonstrate in real time whether the connections among all the quasi-hosted functions are good or not.

In addition, the XSLT stylesheet parses hosted function XML configuration files for the latter's initialization status so that the proper source code can be generated to ensure the quasi-hosted function can start up according to the specification in the right mode. This completes the full quasi-hosted function—initialization and data transmission or receiving.

The module XML configuration file defines how all the hosted functions under it are laid out inside the module, and how all of them are related to the module, and the scheduling of all the hosted functions. All these parameters are picked up by XSLT stylesheets so that proper source code can be created for the targeted quasi-hosted function to avoid any contention for hardware resources or any unintentional waste of those resources.

The Static Simulated Auto Code Generation works one module at a time. To create an entire system that embraces multiple modules, the user simply needs to populate the tool chain programmatically (by using script, for example) to all the modules and add a top level (system level) makefile. With a hit of the return key, the entire system that contains all the modules and all the quasi-hosted functions under each module can be automatically generated, built, and ready to be loaded to different hardware modules like GPMs, LRUs, and RDCs.

For a particular system of networked computers, there may be several score of nodes configured in the ICD with tens of thousands of communication channels distributed among the nodes via different communication protocols. The Static Simulation Auto Code Generation tool chain will produce quasi-hosted function application programs to cover every computer node and each communication channel, plus many switches that wire these computer nodes together. When every computer node and each communication channel in the system is connected, one can prove that the sets of module level XML configuration files are correct and accurate and they are ready to be distributed to the hosted function suppliers.

In accordance with one embodiment, the system of networked computers is an avionics system of the type depicted in FIG. 1. In that instance, a quasi-hosted function application can be generated for each function to be hosted on each GPM, LRU, and RDC. These executable files are then loaded into the respective hardware components. This allows one to simulate the entire avionic system communications functionality on the avionics system hardware before the existence of validated and verified hosted function applications. When a supplier brings in a real hosted function application for testing and system integration, that real hosted function application can be substituted for the corresponding quasi-hosted function application in the system infrastructure. The real hosted function applications can be tested one at a time until the entire system functions in accordance with the interface configuration specifications.

In addition to connectivity testing and verification, the application programs produced by Static Simulation Auto Code Generation can also conduct system characterization, performance and fault tolerance. For example, by design (which should be reflected in the ICD database) any single node failure should not cripple the entire system. One can disable a computer node deliberately and check out the system level fault tolerance via connectivity.

System performance is another aspect that can be enhanced using Static Simulation Auto Code Generation. In the past, airplane engineers calculated and distributed the system load via the ICD, but they did not check out their calculations or test them beyond simple modeling. Now with the Static Simulation Auto Code Generation tool chain, the system performance and characterization can be observed easily. Any mishaps and abnormal behaviors can be collected and the right data and parameters can be fed back into the ICD for further fine tuning and testing.

Evaluating the connectivity performance of a real hosted function during transmission of data on the network can also be used to test system hardware for performance, characterization and resource allocation. The hardware includes GPMs, LRUs, RDCs, AFDX switches, and End Systems. The test can reveal GPM processor (CPU) performance and resource allocation, demonstrate AFDX switch jitters and virtual links allocation, and show End System behavior in a live avionics working environment In short, the Static Simulation Auto Code Generation tool chain can automatically generate a running and functioning applications to statically simulate airplane level avionics system and validate and verify ICD configuration data and parameters, check components rates/frequencies, and test system level computing resource allocation and performance. The test results can then be fed back into ICD to prompt a new round of configuration files and new applications can be automatically generated and tested again. The process can go on until satisfactory connectivity is achieved.

While the invention has been described with reference to certain embodiments, it will be understood by those skilled in the art that various changes may be made and equivalents may be substituted for elements thereof without departing from the scope or spirit of the invention. In addition, many modifications may be made to adapt a particular situation to the teachings of the invention without departing from the essential scope or spirit thereof. Therefore it is intended that the invention not be limited to the particular embodiment disclosed as the best or preferred mode contemplated for carrying out this invention, but that the invention will include all embodiments falling within the scope of the appended claims.

The invention claimed is:

1. A method for simulating the connectivity of hosted function applications hosted on hardware modules which are connected to network switches via end systems, comprising the following steps:

storing in an interface configuration database a respective module configuration file for each hardware module of a multiplicity of hardware modules, wherein each module configuration file defines each hosted function application to be hosted in a respective hardware module for memory size, execution rate and schedule, and how all hosted function applications should be connected with other hosted function applications;

storing in said interface configuration database a respective hosted function configuration file for each hosted function to be contained in any hardware module, wherein each hosted function configuration file has information concerning what communication protocol to use to communicate with another hosted function application, whether this hosted function application is a sender or receiver, memory resource allocation for this hosted function application, transmission and receiving data block sizes, and data transmission rates;

extracting hosted function configuration information from said interface configuration database;

auto generating a first set of respective quasi-hosted function source code files from said extracted hosted function configuration information for each one of a plurality of quasi-hosted functions that simulate the communications functions of respective ones of said hosted function applications;

creating makefiles that define how to compile each quasi-hosted function source code file of said first set and how to link them together;

building executable files for said first set of quasi-hosted function applications using at least said makefiles and said first set of quasi-hosted function source code files;

loading said executable files into the hardware modules;

after said executable files have been loaded, causing one or more of said auto generated quasi-hosted function applications to exchange data blocks among other quasi-hosted function applications via the network switches; and using the auto generated quasi-hosted functions to acquire and analyze data representing the connectivity of said quasi-hosted function applications during said data exchanges, wherein each of said quasi-hosted function applications simulates a sender and/or a receiver of a respective desired hosted function application with the same inputs and outputs format, but lacks algorithms to process these inputs and outputs.

2. The method as recited in claim 1, wherein each of said quasi-hosted function applications simulates a sender and/or a receiver of a respective desired hosted function application with the same inputs and outputs format, but lacks algorithms to process these inputs and outputs.

3. The method as recited in claim 1, further comprising the step of generating instrumentation algorithm source code buried in said quasi-hosted function source code, wherein said instrumentation algorithm source code, when executed, is capable of logging any one of the following:

mismatch of data block size, mismatch of rates/frequencies or total miss of message data blocks, and network, switches, and end systems jitters in various real avionics operating modes.

4. The method as recited in claim 1, further comprising the step of verifying the time durations and data block size allocated for each quasi-hosted function application to transmit data on the network.

5. The method as recited in claim 1, further comprising the step of evaluating the connectivity performance of each quasi-hosted function application during transmission of data on the network.

6. The method as recited in claim 5, further comprising the steps of:

generating a second set of respective quasi-hosted function source code files that include instrumentation algorithms to take into account any mishaps or abnormal behavior identified during said evaluating step;

creating makefiles that define how to compile each quasi-hosted function source code file of said second set and how to link them together;

building executable files for said second set of quasi-hosted function applications using at least said makefiles and said second set of quasi-hosted function source code files;

loading said executable files for said second set of quasi-hosted function applications into the hardware modules in place of said executable files for said first set of quasi-hosted function applications;

after said executable files for said second set of quasi-hosted function applications have been loaded, causing one or more of said quasi-hosted function applications to exchange data blocks among other quasi-hosted function applications via the network switches; and acquiring and analyzing data representing the connectivity of said quasi-hosted function applications during said data exchanges.

7. The method as recited in claim 1, further comprising the step of determining the impact of disablement of one of said quasi-hosted function applications on the connectivity performance of other quasi-hosted function applications.

8. The method as recited in claim 1, wherein said configuration files are in XML format, and said generating step comprises invoking XSLT stylesheets in a predetermined order to parse configuration parameters and data in said XML configuration files to generate said quasi-hosted function source code files.

9. The method as recited in claim 1, wherein said executable files simulate avionics system communications functionality.

10. A method for simulating the connectivity of hosted function applications hosted on hardware modules which are connected to network switches via end systems, comprising the following steps:

storing in an interface configuration database a respective module configuration file for each hardware module of a multiplicity of hardware modules, wherein each module configuration file defines each hosted function application to be hosted in a respective hardware module for memory size, execution rate and schedule, and how all hosted function applications should be connected with other hosted function applications;

storing in said interface configuration database a respective hosted function configuration file for each hosted function to be contained in any hardware module, wherein each hosted function configuration file has information concerning what communication protocol to use to communicate with another hosted function application, whether this hosted function application is a sender or receiver, memory resource allocation for this hosted function application, transmission and receiving data block sizes, and data transmission rates;

extracting hosted function configuration information from said interface configuration database;

auto generating a set of respective quasi-hosted function source code files from said extracted hosted function configuration information for each one of a plurality of quasi-hosted functions that simulate the communications functions of respective ones of said hosted function applications;

creating makefiles that define how to compile each quasi-hosted function source code file and how to link them together;

building executable files for said quasi-hosted function applications using at least said makefiles and said quasi-hosted function source code files;

loading said executable files into the hardware modules;

loading an executable file for a real hosted function application in place of one of said executable files for one of said quasi-hosted function applications that simulates the communications functions of said real hosted function application;

after said executable files have been loaded, causing said real hosted function application to exchange data blocks with said auto generate quasi-hosted function applications via the network switches; and using the auto generated quasi-hosted functions to acquire and analyze data representing the connectivity of said real hosted function application during said data exchanges, wherein each of said quasi-hosted function applications simulates a sender and/or a receiver of a respective desired hosted function application with the same inputs and outputs format, but lacks algorithms to process these inputs and outputs.

11. The method as recited in claim 10, wherein each of said quasi-hosted function applications simulates a sender and/or a receiver of a respective desired hosted function application with the same inputs and outputs format, but lacks algorithms to process these inputs and outputs.

12. The method as recited in claim 10, further comprising the step of generating instrumentation algorithm source code buried in said quasi-hosted function source code, wherein said instrumentation algorithm source code, when executed, is capable of logging any one of the following: mismatch of data block size, mismatch of rates/frequencies or total miss of message data blocks, and network, switches, and end systems jitters in various real avonics operating modes.

13. The method as recited in claim 10, further comprising the step of evaluating the connectivity performance of said real hosted function application during transmission of data on the network.

14. The method as recited in claim 10, wherein said configuration files are in XML format, and said generating step comprises invoking XSLT stylesheets in a predetermined order to parse configuration parameters and data in said XML configuration files to generate said quasi-hosted function source code files.

15. The method as recited in claim 10, wherein said executable files simulate avionics system communications functionality.

16. A computer system for automatically generating source code representing quasi-hosted function applications, said computer system comprising:
  computer memory storing a respective module XML configuration file for each hardware module of a multiplicity of hardware modules and a respective hosted function XML configuration file for each hosted function to be contained in any hardware module, wherein each module configuration file defines each hosted function application to be hosted in a respective hardware module for memory size, execution rate and schedule, and how all hosted function applications should be connected with other hosted function applications, and wherein each hosted function XML configuration file has information concerning what communication protocol to use to communicate with another hosted function application, whether this hosted function application is a sender or receiver, memory resource allocation for this hosted function application, transmission and receiving data block sizes, and data transmission rates; and
  a processor programmed to execute a software tool chain comprising a script program and a set of XML extensible stylesheet language (XSLT) files, wherein said script program is designed to read said module XML configuration files, create build directories for quasi-hosted function source code files, compose makefiles in those directories to build executable files based on quasi-hosted function source codes, and invoke the proper XSLT files to automatically generate the quasi-hosted function source code files, and wherein said XSLT files are designed to extract hosted function configuration information from said hosted function XML configuration files and generate said quasi-hosted function source code files from said extracted hosted function configuration information for each one of a plurality of quasi-hosted functions that simulate the communications functions of the respective hosted function applications,
  wherein each of said quasi-hosted function applications simulates a sender and/or a receiver of a respective desired hosted function application with the same inputs and outputs format, but lacks algorithms to process these inputs and outputs, said quasi-hosted function source code files containing source code for sending and/or receiving message data blocks with predetermined data block size, at predetermined rates, with a predetermined protocol, and to a designated receiver or from a designated sender.

17. The system as recited in claim 16, wherein said script program reads each module XML configuration file to create one sub-directory for each hosted function application under a module folder and fill in relevant makefiles in those directories.

\* \* \* \* \*